UNITED STATES PATENT OFFICE.

CLARENCE QUINAN, OF PINOLE, CALIFORNIA.

PROCESS OF MAKING GUNCOTTON.

SPECIFICATION forming part of Letters Patent No. 597,565, dated January 18, 1898.

Application filed March 31, 1897. Serial No. 630,136. (No specimens.)

*To all whom it may concern:*

Be it known that I, CLARENCE QUINAN, a citizen of the United States, residing at Pinole, county of Contra Costa, State of California, have invented an Improvement in the Manufacture of Guncotton; and I hereby declare the following to be a full, clear, and exact description of the same.

My invention relates to improvements in the manufacture of guncotton from hydrocellulose. In this method of manufacture the cellulose fiber, by chemical and mechanical treatment, is first reduced to a fine powder before it is nitrated. The difficulty of regaining the spent acid is a drawback to this method, which is therefore not in general vogue, but it has certain advantages over the ordinary or "hank" process. The nitration is very rapid, the yield is good, and the plant comparatively inexpensive.

The object of converting the cellulose into hydrocellulose is to render the fiber brittle and facilitate its pulverization in "rumbling barrels" or other suitable grinding apparatus. The chemical change may be produced by mineral acids, either in the vapor or liquid form. In practice advantage is taken of the fact that by the aid of heat a very small amount of acid may be made effective. As the hydrocellulose powder must be thoroughly dried before it is nitrated, it is better to use an acid which can be readily volatilized. The fiber drained of the acid and dried at a temperature of about 212° Fahrenheit is made very brittle and is easily ground to a fine powder. This process is both convenient and economical of acid. The chemical conversion is chiefly done on the drier by means of the heat and the small amount of acid in the fiber. This is finally evaporated during the drying.

The manufacture of smokeless powder has created a demand for a specially pure guncotton.

The object of my invention is the preparation of an improved and purified hydrocellulose with a view to a corresponding improvement in the quality of the resulting guncotton. Cellulose fiber available for the manufacture of guncotton contains from one to two per cent. of mineral ash. The guncotton made therefrom contains not only this original ash, but from one to five per cent. of unnitrated cellulose. I have found by repeated experiment and analysis that the amount of unnitrated cellulose in the guncotton depends *ceteris paribus* upon the amount of ash originally present in the fiber and increases rapidly therewith. My invention is based upon this discovery. It is highly probable that the mineral matter, which is chiefly silica, magnesia, and lime, exists as an incrustation or glaze that impedes the action of the acids in nitrating the fiber. The special object of my invention is to remove this mineral matter during the preparation of the fiber, or, in other words, to make a hydrocellulose which shall be free or nearly free of ash. It consists in a preliminary treatment of the fiber to dissolve and wash out the mineral matter. By experiment I find that this can be done by using various acids provided they are fairly strong. I also find that the action is facilitated by heat.

In carrying out my process the fiber, in the form of cotton rags, waste, lint, or wool, is steeped in an acid-bath, preferably nitric acid, of the strength of 25° Baumé, heated to about 100° Fahrenheit. This is left to digest not less than eight hours. It is then removed, drained, and washed in water until the acid is much reduced in strength. It will be found convenient to regulate the second bath in which it is washed, so that it shall contain two or three per cent. of acid. The conversion into hydrocellulose is then completed upon the drier. By this treatment a fiber containing 1.50 per cent. of ash will yield a hydrocellulose containing 0.3 per cent. or less. This improved hydrocellulose is found, when compared with the ordinary product, to give a larger yield and higher degree of nitration from the same acids, and the unnitrated fiber will be very small.

I do not confine myself to the use of nitric acid of 25° Baumé, though an acid of less strength is less efficient and one much stronger is apt to injure the fiber. Commercial muriatic acid answers very well, but, as before stated, the nitric acid is preferable, because it is almost a waste product of the factories where high explosives are manufactured. When nitric acid is used for the bath, the fiber should not be taken direct from the strong bath to the drier on account of the danger of fire. The bath may be used several times or until the acid becomes too highly charged with the mineral matter. The spent acid may still be used for ordinary purposes.

Having thus described my invention, what I claim as new, and desire to secure by Letters Patent, is—

1. The process of preparing essentially ash-free hydrocellulose for the manufacture of guncotton, consisting in steeping fiber in a bath of heated mineral acid capable of dissolving the mineral matter contained therein, then washing out the mineral matter with a weak acid-bath, and finally heating the same to complete the conversion into hydrocellulose.

2. The process of manufacturing guncotton, consisting in first steeping a cellulose fiber in a bath of heated nitric acid capable of dissolving the mineral matter contained therein, washing out the mineral matter with a weak acid-bath, heating the same to complete conversion into hydrocellulose and pulverizing and nitrating the same.

In witness whereof I have hereunto set my hand.

CLARENCE QUINAN.

Witnesses:
WILLIAM ARTHUR WILLIAMS,
ROBERT VAUGHAN MONTAGUE CORDELL.